United States Patent

Inoue

[11] Patent Number: 5,926,638
[45] Date of Patent: Jul. 20, 1999

[54] PROGRAM DEBUGGING SYSTEM FOR DEBUGGING A PROGRAM HAVING GRAPHICAL USER INTERFACE

[75] Inventor: Masaharu Inoue, Tokyo, Japan

[73] Assignee: NEC Corporation, Japan

[21] Appl. No.: 08/785,589

[22] Filed: Jan. 17, 1997

[30] Foreign Application Priority Data

Jan. 17, 1996 [JP] Japan .................................. 8-005906

[51] Int. Cl.$^6$ ........................................... G06F 11/00
[52] U.S. Cl. ..................................... 395/704; 395/183.14
[58] Field of Search ............................... 395/704, 183.14

[56] References Cited

U.S. PATENT DOCUMENTS

| | | | |
|---|---|---|---|
| 4,885,717 | 12/1989 | Beck et al. | 395/704 |
| 5,093,914 | 3/1992 | Coplien et al. | 395/704 |
| 5,175,856 | 12/1992 | Van Dyke et al. | 395/704 |
| 5,179,702 | 1/1993 | Spix et al. | 395/704 |
| 5,265,254 | 11/1993 | Blasciak et al. | 395/704 |
| 5,446,900 | 8/1995 | Kimelman | 395/704 |
| 5,450,586 | 9/1995 | Kuzara et al. | 395/704 |
| 5,507,030 | 4/1996 | Sites | 395/704 |
| 5,600,789 | 2/1997 | Parker et al. | 395/183.14 |
| 5,732,210 | 3/1998 | Buzbee | 395/704 |
| 5,740,440 | 4/1998 | West | 395/704 |
| 5,758,122 | 5/1998 | Corda et al. | 395/704 |
| 5,764,989 | 6/1998 | Gustafsson et al. | 395/704 |
| 5,778,230 | 7/1998 | Wimble et al. | 395/704 |
| 5,781,720 | 7/1998 | Parker et al. | 395/183.14 |
| 5,815,653 | 9/1998 | You et al. | 395/704 |

FOREIGN PATENT DOCUMENTS

| | | |
|---|---|---|
| 0606684 | 7/1994 | European Pat. Off. ........ G06F 11/00 |
| 1-100642 | 4/1989 | Japan . |
| 3-271949 | 12/1991 | Japan . |
| 4-111024 | 4/1992 | Japan . |
| 4-260941 | 9/1992 | Japan . |
| 4-271440 | 9/1992 | Japan . |

Primary Examiner—Tariq R. Hafiz
Assistant Examiner—John Q. Chavis
Attorney, Agent, or Firm—Ostrolenk, Faber, Gerb & Soffen, LLP

[57] ABSTRACT

In a program debugging system for debugging a program having a graphical user interface (GUI), a translator program for translating a source program into a machine language program includes a GUI information output function for extracting information of a GUI parts from the source program and outputting a GUI information relating an operation descriptor describing an operation of the GUI parts, with the GUI parts itself. A debugger includes a break condition setting function for retrieving the source program with reference to the GUI information, to find out the operation descriptor corresponding to the GUI parts designated on a computer display screen, and for setting the break condition for the operation descriptor retrieved. Thus, a trouble or load for a program analysis at the program debugging time is omitted and the debugging procedure is simplified, so that efficiency of the program development and quality of the program developed are elevated.

3 Claims, 10 Drawing Sheets

FIGURE 5

| TYPE | POSITION (X-COORDINATE) | POSITION (Y-COORDINATE) | HEIGHT | WIDTH | PROCESSING FUNCTION NAME |
| --- | --- | --- | --- | --- | --- |
| WINDOW | 10 | 10 | 100 | 200 | BaseWndProc |
| TEXT | 20 | 20 | 80 | 190 | TextWnd |
| PUSH BUTTON | 50 | 90 | 10 | 20 | OkPushB |
| PUSH BUTTON | 100 | 90 | 10 | 20 | CancelPushB | ns shown as a relocatable file 1208. Further, the
PROGRAM DEBUGGING SYSTEM FOR DEBUGGING A PROGRAM HAVING GRAPHICAL USER INTERFACE

BACKGROUND OF THE INVENTION

1. Field of the Invention

The present invention relates to a program debugging system, and more specifically to a program debugging system for debugging a program having a graphical user interface (conventionally abbreviated to "GUI").

2. Description of Related Art

In the prior art, a program debugging system is widely used in various kinds of data processing systems for the purpose of ascertaining problems in of a developed data processing program.

Referring to FIG. 1, there is shown a block diagram of an example of one typical conventional program debugging system, showing a data processing function and a flow of data processing simultaneously. The shown program debugging system includes a software-based processing means such as a translator program 1207, a linker 1209 and a debugger 1211.

First, how to realize a source program 1206 having a GUI is described.

Most programs having a GUI are realized in the style of an event-driven program. Here, the "event-driven program" means a program constructed to execute any processing if an external factor changes, and the "event-driven program" in a GUI program executes any processing corresponding to a GUI handling when a GUI parts is handled. In addition, in many cases, a system having the GUI is provided with a library having a standard scheme and operation of the system and for realizing an event-driven GUI program operating on the system (called a "GUI library" hereinafter).

In addition to preparing functions of other than a GUI processing (1202), a program developer designs the GUI (1203) using a GUI library 1201, and simultaneously, prepares an operation describing function 1204 describing the operation of the GUI. Thereafter, the program developer relates the designed GUI with the operation describing function (1205), by also using the GUI library 1201. When the program thus designed is executed, at each time the GUI is handled, a corresponding operation describing function 1204 is executed.

A translator program 1207 is a software for translating the source program 1206 written in a high level language, into a machine language program (1208), and a linker 1209 is a software for coupling a plurality of programs (1208) into one program (1210) so as to make it possible that data and subroutines defined in one program can be used in another program. A debugger 1211 is a software used for finding out and removing errors in the developed program (1210).

In general, a van Neumann type computer contains a machine language program stored in a memory, and realizes an operation intended by the developer, by executing instructions of the program. The machine language program is expressed in a train of numeric characters in a binary notification or in hexadecimal notation, understandable to the computer. However, since this train of numeric characters is too complicated for a human being to understand, the program developer prepares the source program 1206 by using an expression easy to understand, and then, translates the source program 1206 into a machine language by the translator program 1206. In an example shown in FIG. 1, since an address is indefinite, each file of machine language program is shown as a relocatable file 1208. Further, the developer uses the linker 1209 to bring the relocatable files 1208 into one program (which is shown as an executable file 1210 in FIG. 1) and stores the program into an external memory of a computer.

In order to confirm unquestionableness of the program thus produced, and in order to investigate a cause of an erroneous operation if the erroneous operation is found out, it is effective to use a verifying program called a "debugger" 1211. When the program is executed on the computer, it is impossible to stop the program at an arbitrary location, and ordinarily, it is possible to recognize no other than information displayed on an output device. Therefore, the debugger 1211 is configured to be capable of executing the program to be debugged, step by step, and of stopping the execution of the program at an arbitrary location. In addition, the debugger 1211 also makes it possible to confirm a program execution condition in the inside of the computer, such as a register and a memory, which cannot be confirmed in the course of an actual program execution on the computer.

Now, how to set a break point in a program to be debugged loaded on a memory and to stop an execution of the program to be debugged at the break point, will be described.

Referring to FIG. 2, there is shown a diagram illustrating a procedure for setting a break point in a conventional program debugging system. More specifically, FIG. 2 illustrates program locations in the memory before and after the break point is set in the program to be debugged loaded in the memory.

A method of executing the program loaded in the memory without modification is possible in the case that an environment under which a program is being developed is the same as an environment under which the program developed actually runs. In addition, in order to set a break point, data of a head line of a machine language at a stop position of the program loaded in the memory is saved, and an interrupt generating code is embedded in place of the saved data.

More detailed explanation of the program location at this time will be made with reference to FIG. 2.

A program location 1301 is a program location in the memory before a break point is set, and a program in a memory region 1302 is a program to be debugged located in the memory. On the other hand, a program location 1303 is a program location in the memory after a break point is set before a line named "L0002".

In the case that an instruction which had put on a break point setting location was saved in a saving memory region 1308, in order to re-start the execution from the saved instruction, a jump instruction for moving the processing to a next instruction address is added in the memory region 1308 so that after the saved instruction is executed, a next instruction will be executed properly. An interrupt generating instruction is embedded at the break point of a memory region 1306 between a memory region 1305 for "L0001" and a memory region 1307 for "L0002". In addition, a debugger routine address of a memory region 1309 is set in an interrupt vector, so that when the interrupt is generated, the processing moves to the debugger routine in the memory region 1309. If the program is executed in this condition, the processing moves into the debugger at the break point, and is brought into a condition for waiting for a command of the debugger. When the debugger receives an instruction of cancelling the setting of the break point, the debugger returns the saved machine language instruction on the execution stopping line, to an original condition.

Incidentally, there is known another method in which, when the debugger executes the program, simulation is executed and stopped by using a simulator means which is a program for simulating execution of the program to be debugged. In this case, a break point setting method is that, the value of an address corresponding to a line of stopping the execution in the simulation execution course, is held, and at each time the simulation of the program to be debugged is executed, the address of the instruction executed is compared with the held address value corresponding to the execution stopping line, and if coincidence is obtained, the processing is moved to the debugger so that the processing is brought into a condition of waiting for a command of the debugger.

Next, a program debugging procedure in the conventional program debugging system will be described about an example that the debugging is conducted by using the debugger 1211 and by setting a break point in a program to be debugged loaded in the memory.

First, a location where the source program 1206 is desired to be stopped for analysis, namely, a break point is searched. If the break point is determined, a command for instructing to stop the processing at the determined break point is delivered to the debugger. The command is delivered either by inputting a word indicative of the command (called simply a "command" hereinafter) and the number indicating the line concerned in the source program, by use of a key board of the computer, or in a debugger capable of displaying the source program, by designating the line concerned by use of an input means indicating a location in the source program on a display screen (called a "pointing device" hereinafter). In general, the machine language program to be debugged includes information which is not used in actual execution but is referred to only when the debugging is executed. For example, the machine language program to be debugged includes information indicating what line of the source program corresponds to the machine language concerned, so that when the source program is indicated on the display screen of the debugger, the source program itself is displayed in place of displaying the machine language.

In particular, when a program having the GUI is the program to be debugged, one break point setting method includes retrieving the program to be debugged, so as to find out an operation descriptor, and to select a location of the operation descriptor as a break point setting location. For this purpose, the source program is retrieved to find out an operation describing function name within the source program by using a program editor (program editing program) on the basis of the developer's memory and documentary records at the time of preparing the program. If this is impossible, the source program is sequentially retrieved by the program editor to find out the GUI library function name, and then, whether or not the found-out GUI library function is a target GUI library function is discriminated on the basis of how the found-out GUI library function is used, and if so, a registered operation describing function name is confirmed by using the GUI library function, and thereafter, a retrieval is conducted again to find out the operation describing function name, in order to determine the break point setting location.

Referring to FIG. 3, there is shown a flow chart illustrating the procedure for setting the break point for the operation describing function in the program having the GUI. As shown in FIG. 3, the processing is started from a step 1401. In a step 1402, whether or not the operation describing function name is remembered is discriminated, and if it is remembered, the operation goes to a step 1409 in which the source program is retrieved to find out the operation describing function name, and then, a break point is set in a step 1410. If the operation describing function name is not remembered, whether or not a design specification exists is discriminated in a step 1404. If the design specification exists, the operation describing function name is investigated from the design specification in a step 1403, and thereafter, the operation goes to the step 1409.

If the design specification does not exist, the operation goes to a step 1405 in which the source program is retrieved to find out the GUI library function name for registering the operation describing function. Thereafter, in a step 1406, how the found-out library function is used is investigated, and in a step 1407, whether or not the found-out library function is the target GUI library function to be found out. If the found-out library function is not the target GUI library function, the operation returns to the step 1405, and the operation of the steps 1405 to 1407 is repeated until the target GUI library function is fount out. If the target GUI library function is found out, the operation goes to a step 1408 in which the registered operation describing function name of the found-out GUI library function is confirmed by utilizing the GUI library function. Thereafter, the operation goes to the step 1409 in which the source program is retrieved to find out the operation describing function name within the source program, and then, the break point is set in the step 1410.

After the break point is sets it starts to execute the program. After the execution is stopped at the break point, the internal status is displayed by using the command, and whether or not the internal status is coincident with the result predicted by the developer is confirmed. If coincidence is not obtained, whether or not an incorrect description exists at the stop position is ascertained. If the incorrect description exists, the incorrect description is modified or corrected. If the internal status is not coincident with the result predicted by the developer but an incorrect description does not exist at the stop position, an internal status ascertaining operation is repeatedly conducted while stopping the operation at a different location relating to the stop position.

In the above mentioned conventional program debugging system, a program analyzer at the debugging time is a program developer. Therefore, if the size of the program is on the order of several hundred steps, it is possible to relatively easily identify the location to be analyzed. However, in the case of developing a large scale program amounting to several ten thousand steps, it is difficult to grasp the program in detail.

Furthermore, if a plurality of developers simultaneously modify the source program, the source program is changing every moment, and on the other hand, the program analyzer often analyzes a location other than the locations prepared by the program analyzer himself. In this case, materials referred to at the time of preparing the program do not often remain, and this becomes a hindrance in analyzing the program.

In addition, in the case of the program having the GUI, although the operation of the GUI parts is shown on the display screen, when the break point is set, it is necessary to analyze the program in order to find out the operation descriptor of the GUI parts. This is troublesome.

SUMMARY OF THE INVENTION

Accordingly, it is an object of the present invention to provide a program debugging system which has overcome the above mentioned defects of the prior art.

Another object of the present invention is to provide a program debugging system for debugging a program having the GUI, capable of omitting a trouble or load for a program analysis at the program debugging time, so as to simplify the debugging procedure, in order to elevate efficiency of the program development and quality of the program developed.

The above and other objects of the present invention are achieved in accordance with the present invention by a program debugging system for debugging a program having a graphical user interface which is abbreviated to "GUI" and which arranges visible parts on a display screen for the purpose of realizing a direct-view handling, the system including a debugging means for stopping execution of a source program at a set break point and ascertaining the program execution condition, wherein a translator means for translating the source program into a machine language program includes a GUI information output means for extracting information of GUI parts from the source program and outputting GUI information relating an operation descriptor describing an operation of the GUI parts, with the GUI parts itself, and the debugging means includes a break condition setting means for retrieving the source program with reference to the GUI information, to find out the operation descriptor corresponding to the GUI parts designated on the display screen, and for setting a break condition for the found-out operation descriptor.

The above and other objects, features and advantages of the present invention will be apparent from the following description of preferred embodiments of the invention with reference to the accompanying drawings.

BRIEF DESCRIPTION OF THE DRAWINGS

FIG. 5 illustrates one example of GUI information in the GUI parts table included in the program debugging system shown in FIG. 4;

DESCRIPTION OF THE PREFERRED EMBODIMENTS

Figure 4:
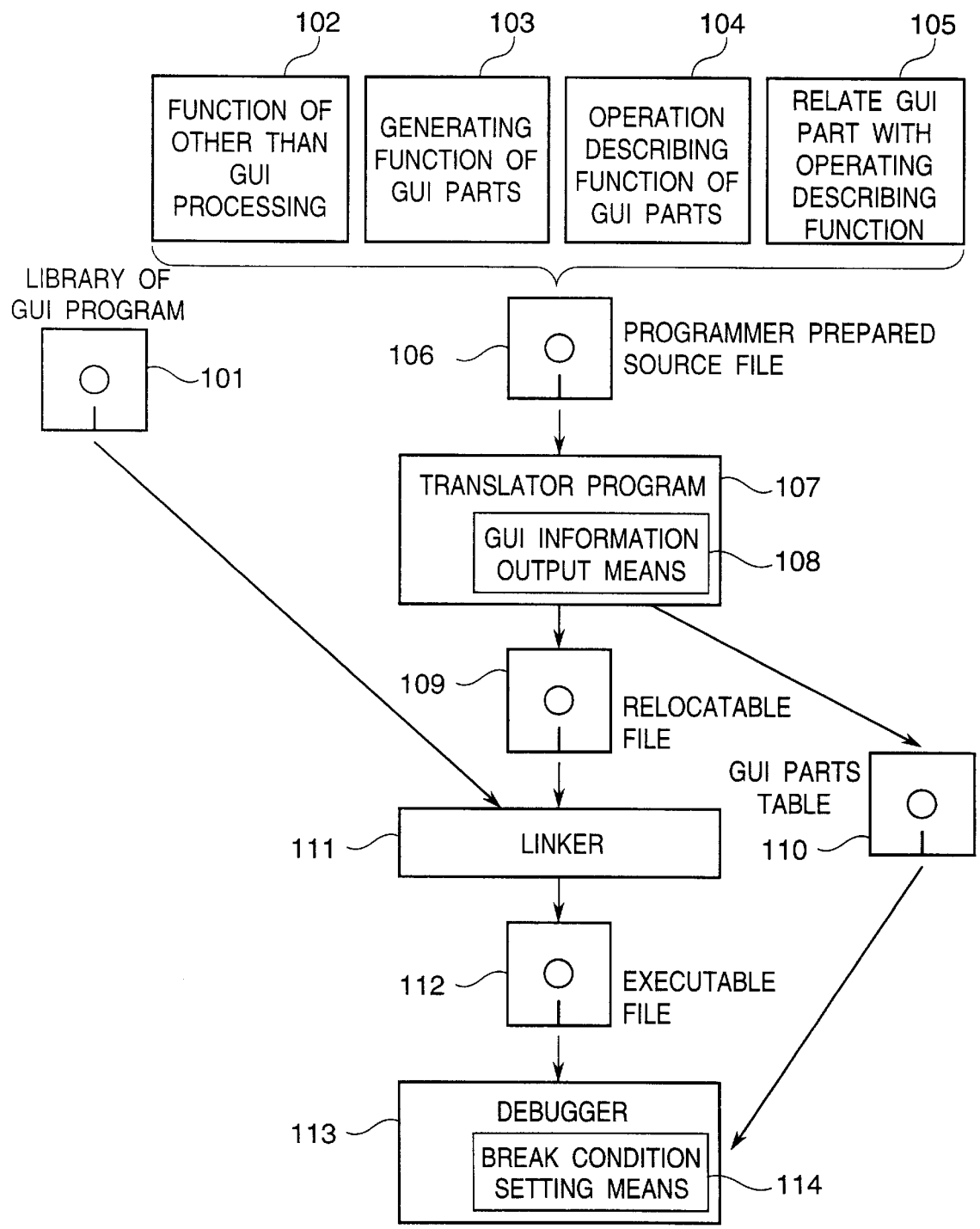
FIG. 4 is a block diagram of an embodiment of the program debugging system in accordance with the present invention, showing a data processing function and a flow of data processing simultaneously.

Referring to FIG. 4, there is shown a block diagram of an embodiment of the program debugging system in accordance with tie present invention, showing a data processing function and a flow of data processing simultaneously.

The shown program debugging system includes various software-based data processing means such as a translator program 107, a linker 111, and a debugger 113. In other words, the shown program debugging system includes the translator means 107, the linker means 111, and a debugger means 113. The software-based data processing means other than the translator program 107 and the debugger 113 are the same as corresponding ones of the conventional program debugging system shown in FIG. 1, and therefore, explanation thereof will be omitted for simplification of description. A main difference between the embodiment of the program debugging system shown in FIG. 4 and the conventional program debugging system shown in FIG. 1, is that a translator means based on the translator program 107 includes a GUI information output means 108, and the debugger means 113 includes a break condition setting means 114 for setting a break point on the basis of the GUI information.

Figure 1:
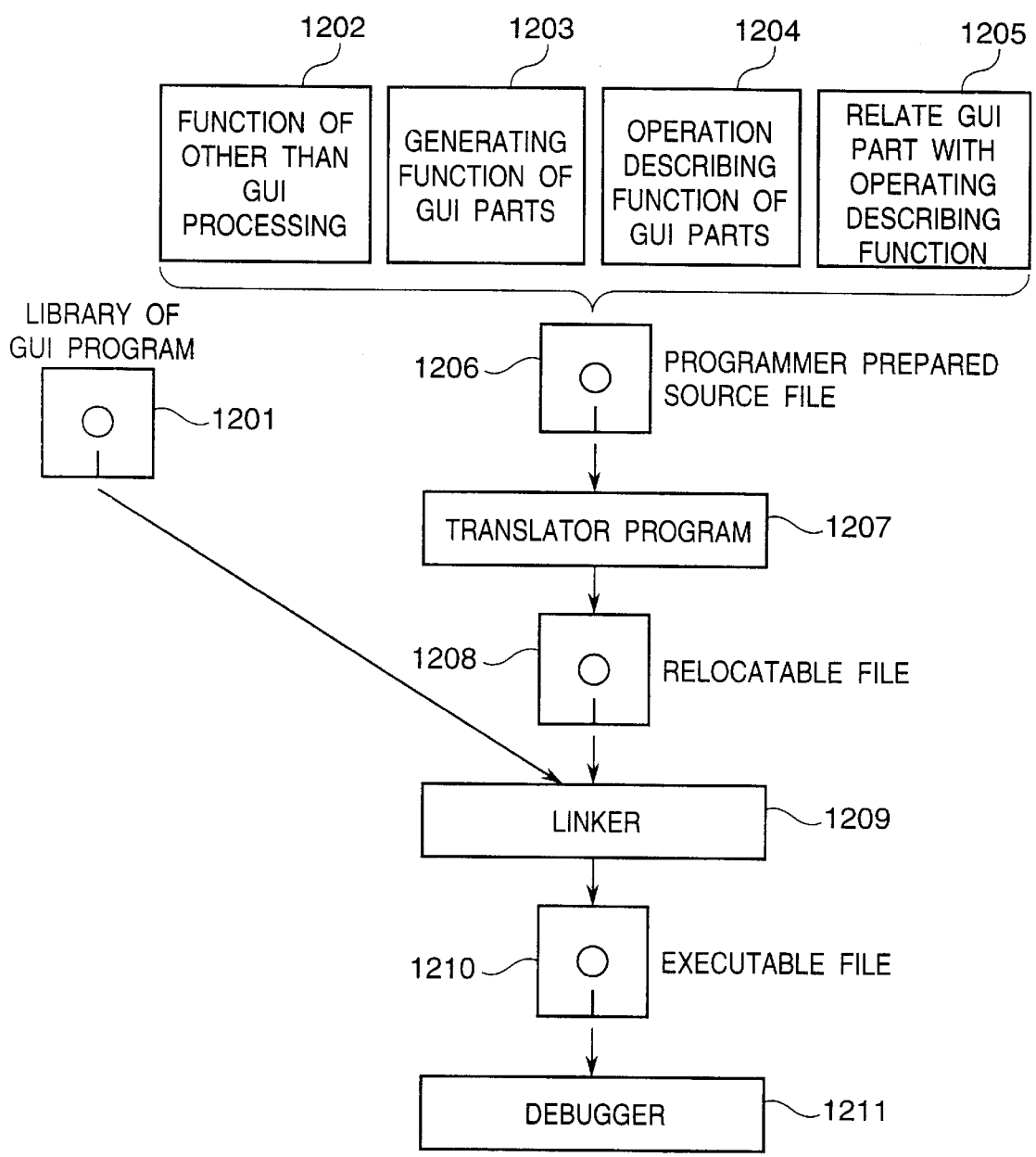
FIG. 1 is a block diagram of an example of one typical conventional program debugging system, showing a data processing function and a flow of data processing simultaneously.
Figure 2:
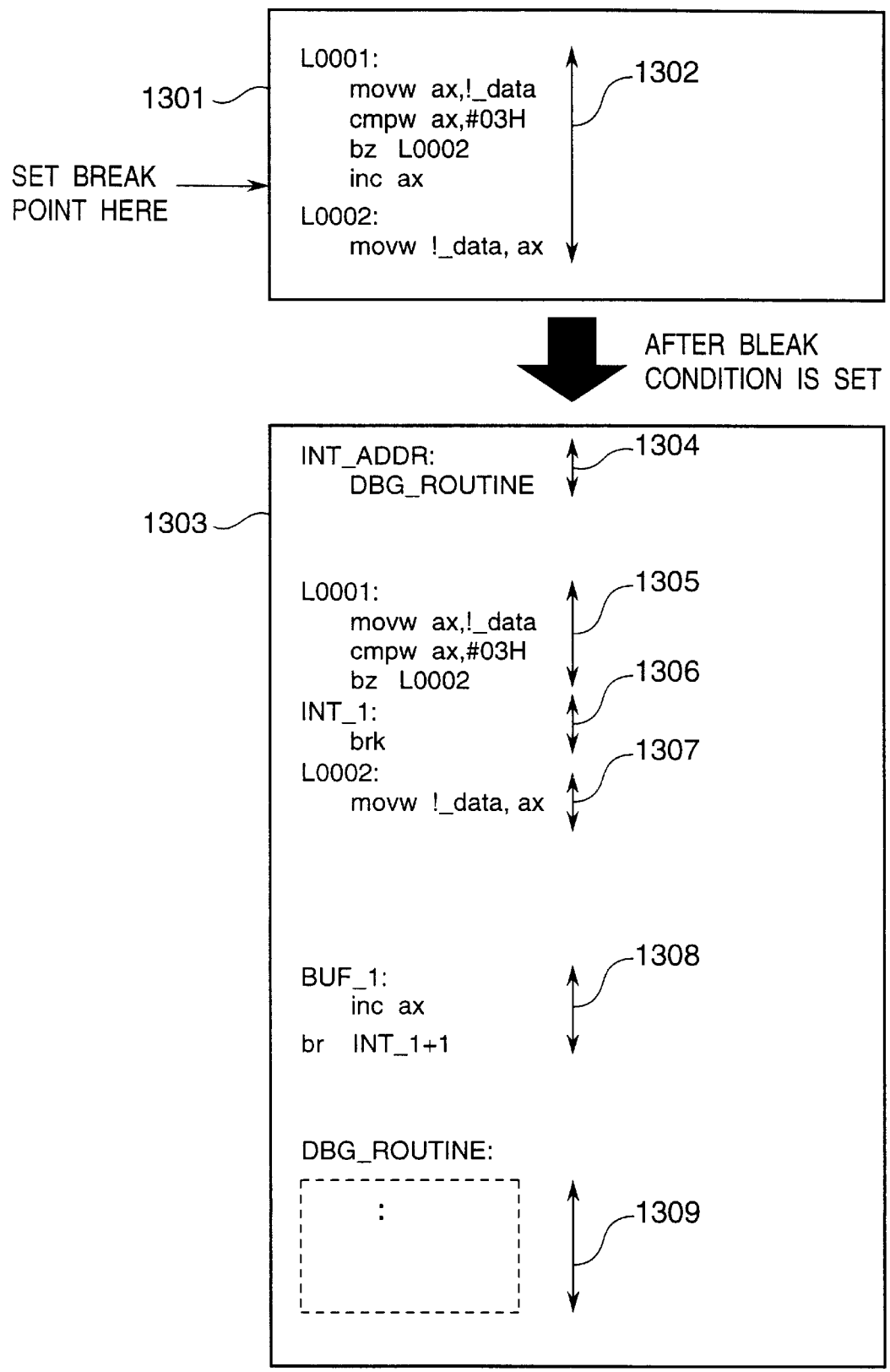
FIG. 2 is a diagram illustrating program locations in the memory before and after the break point is set in the program to be debugged loaded in the memory, for the purpose of illustrating a procedure for setting a break point in a conventional program debugging system.

A method for preparing the source program 106 having the GUI is the same as that in the conventional program debugging system shown in FIG. 1, and therefore, explanation thereof will be omitted for simplification of description. Namely, ones designated by Reference Numerals 101 to 106 correspond to those designated by Reference Numerals 1201 to 1206 in FIG. 1, respectively.

The program developer describes operation of the GUI parts in the source program 106, but the procedure 103 for realizing the GUI parts on the display screen, the procedure 104 for generating the operation describing function describing the operation of the realized GUI parts, and the procedure 105 for relating the realized GUI parts with the generated operation describing function, are in accordance with procedures determined by a system for realizing the GUI. In any system, accordingly, information relating the realized GUI parts with the generated operation describing function necessarily exists in the source program.

The translator program 107 is a software means for translating the source program 106 written in a high level language, into a machine language program, similarly to the translator program 1207 in the conventional program debugging system shown FIG. 1. In the shown embodiment, the translator program 107 not only translates the source program 106 into a machine language, but also includes the GUI information output means 108 extracting the information of the GUI parts in the source program 106, for outputting to the debugger 113 the GUI information relating the GUI parts with the operation descriptor.

Referring to FIG. 5, there is illustrated the content of a GUI parts table 110 shown in FIG. 4, which is one example of the GUI information outputted from the GUI information output means 108.

The GUI parts table 110 includes a "type" column 201 indicating the kind of the GUI parts, an "X-coordinate position" column 202 indicating an X-coordinate position of the GUI parts on the display screen, a "Y-coordinate position" column 203 indicating a Y-coordinate position of the GUI parts on the display screen, a "height" column 204 indicating the height of the GUI parts, a "width" column 205 indicating the width of the GUI parts, and a "name" column 206 indicating the operation describing function name of an operation executed when the GUI parts is handled.

Similarly to the debugger 1211 of the conventional debugging system shown in FIG. 1, the debugger 113 is a software means capable of executing the program to be debugged, step by step, and stopping the execution at any arbitrary position, and also of ascertaining the program execution internal condition of the computer such as a register, a memory, etc. which cannot be ascertained when the program is actually executed in an actual computer. In the shown embodiment, however, the debugger 113 further includes the break condition setting means 114 for retrieving the source program with reference to the GUI information of the GUI parts table 110 shown in FIG. 5, to find out the operation descriptor of the GUI parts designated on the computer display screen, and for setting the break point.

Figure 6:
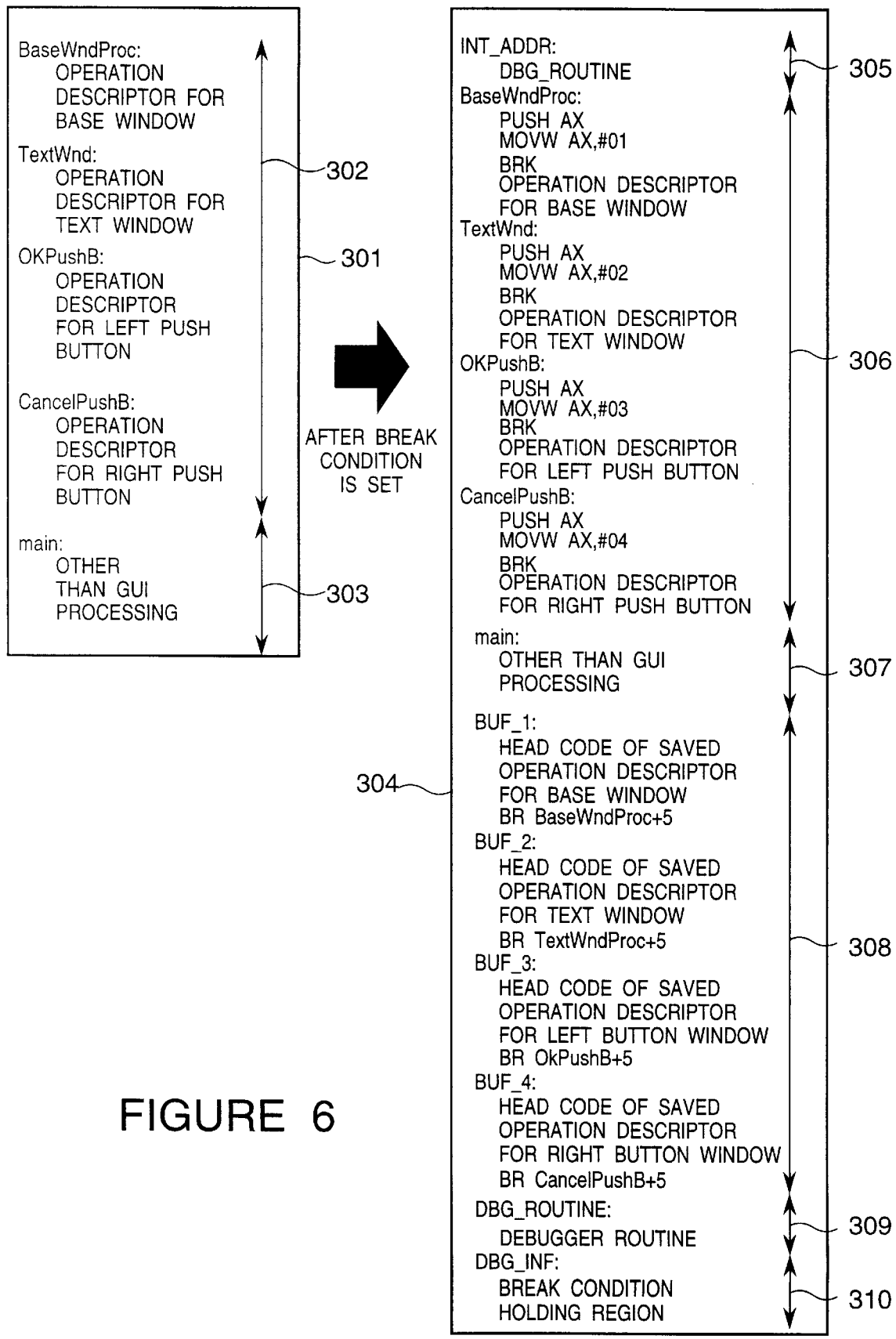
FIG. 6 is a diagram illustrating program locations in the memory before and after the break point is set in the program to be debugged loaded in the memory, for the purpose of illustrating a procedure for setting a break point in the program debugging system shown in FIG. 4.

Referring to FIG. 6, there is shown a diagram illustrating program locations in the memory before and after the break point is set in the program to be debugged loaded in the memory, for the purpose of illustrating a break point setting procedure executed by the break condition setting means 114 included in the debugger 113 shown in FIG. 4. Now, the break point setting procedure will be described with reference to FIG. 6.

In FIG. 6, a program location 301 is a program location in the memory before the break point setting, and a program location 304 is a program location in the memory after the break point is set by use of the debugger 113. The program location 304 illustrates that after the break point is set, both the program to be debugged and the debugger program are stored in the memory. Here, the program to be debugged includes the operation describing functions and the other than the operation describing functions. However, whether or not the functions included in the program to be debugged are the operation describing function, is clearly discriminated on the basis of the GUI information of the GUI parts table 110.

Thus, after the program to be debugged is loaded in the memory, the debugger 113 executes retrieval to find out the operation describing functions within a memory region 306, with reference to the processing function names 206 in the GUI parts table 110, and saves a head code of each found-out operation describing function into a memory region 308. In this connection, a jump instruction is added next to each saved code so as to ensure that when the saved code is executed, the processing goes to a code next to the saved code without fail. When each operation describing function is executed, a particular value is set in a register AX in order to identify the operation describing function, and thereafter, the processing at the address set in an interrupt vector address of a debugger routine of a memory region 309 within the program location 304 is executed by use of an interrupt instruction. At this time, if the processing is executed in the break setting mode, the break condition is set in a memory region 310.

Figure 7:
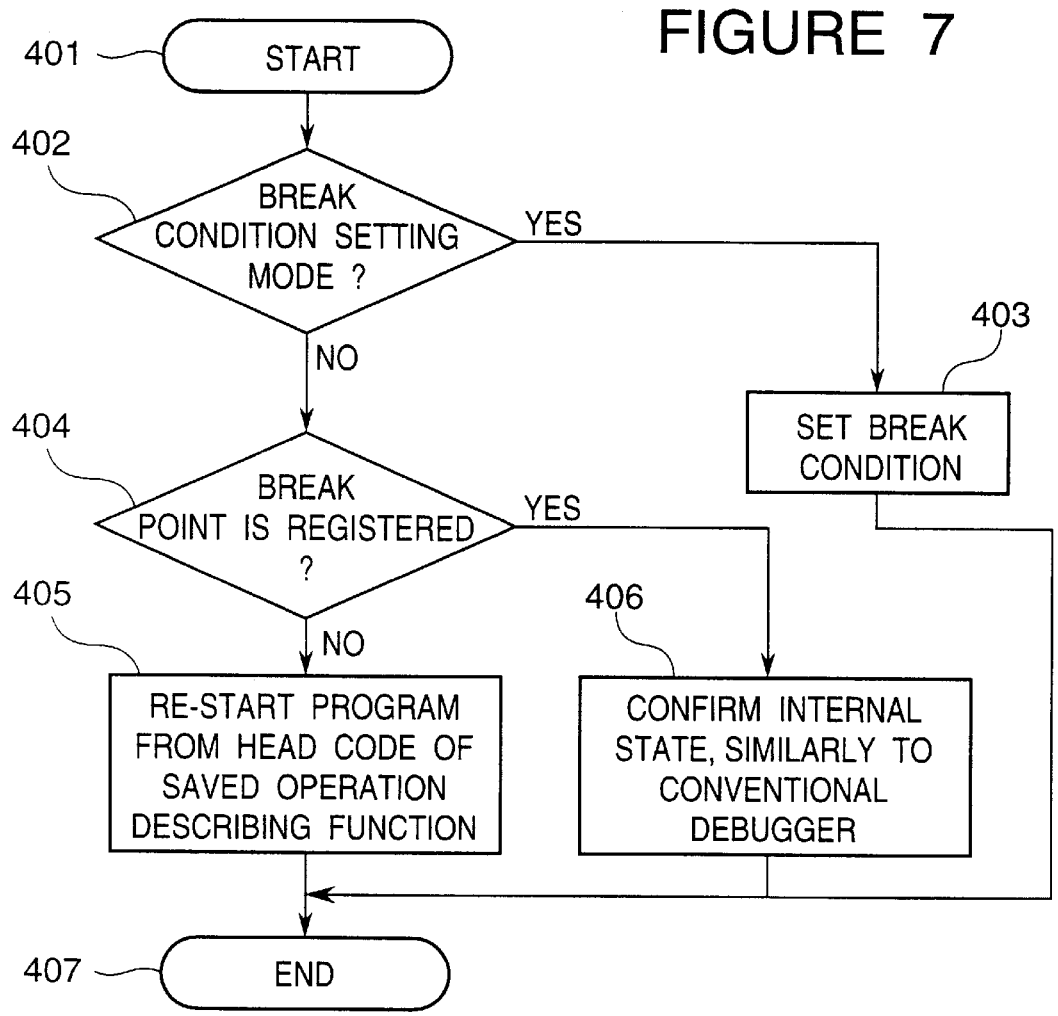
FIG. 7 is a flow chart illustrating the processing in the debugger routine shown in FIG. 6.

Referring to FIG. 7, there is shown a flow chart illustrating, in detail, the processing of the debugger routine executed at this time.

The processing is started from a step 401, and in a step 402, whether or not the processing is in the break setting mode is determined. If the processing is in the break setting mode, the processing goes into a step 403, in which the break information is held in a memory region 307. If the processing is other than the break setting mode, the processing goes into a step 404 in which, whether or not the break point is set is determined with reference to the memory region 307. If the break point is set in the memory region 307, the processing goes into a step 406 in which, similarly to the conventional debugger, it waits for a command and if the command is supplied, the instruction is executed. If the break point is not set in the memory region 307 in the step 404, the processing goes into a step 405 in which it re-starts to execute the program from the head code of the saved operation describing function.

Next, a program debugging procedure in the program debugging system of the shown embodiment will be described. The following description will be made, with reference to the drawings, about an example in which the debugging is executed by using the debugger 113 and by setting the break point in the program to be debugged loaded in the memory.

Figure 8:
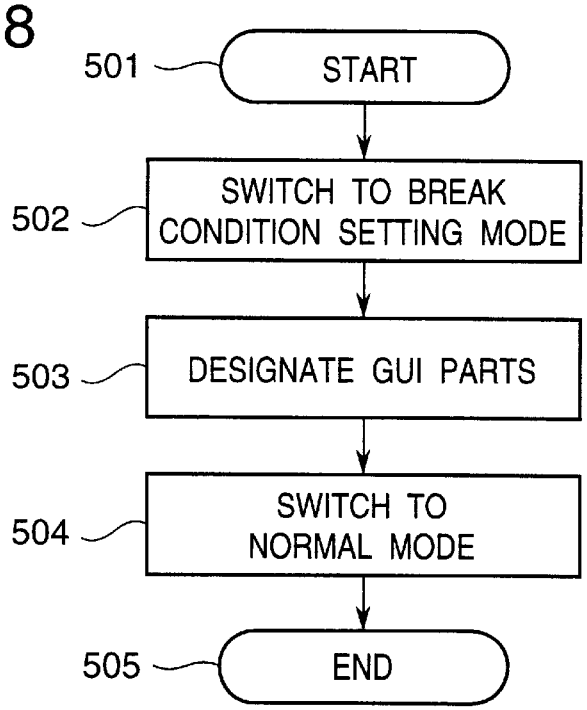
FIG. 8 is a flow chart illustrating the procedure for setting the break point in the program debugging system shown in FIG. 4.

Referring to FIG. 8, there is shown a flow chart illustrating the procedure for setting the break point in the program debugging system shown in FIG. 4. As shown in FIG. 8, in a step 501, the processing starts, and in a step 502, the processing is switched to the break setting mode. In a step 503, the GUI parts is designated on the display screen, and in a step 504, the processing is switched back to a normal mode. Thus, the break point setting operation is completed in a step 505.

Referring to FIGS. 9A to 9F, there are shown views diagrammatically illustrating a computer display screen sequentially changing at the program debugging time in the program debugging system shown in FIG. 4, in the order of the debugging procedure.

Figure 9A:
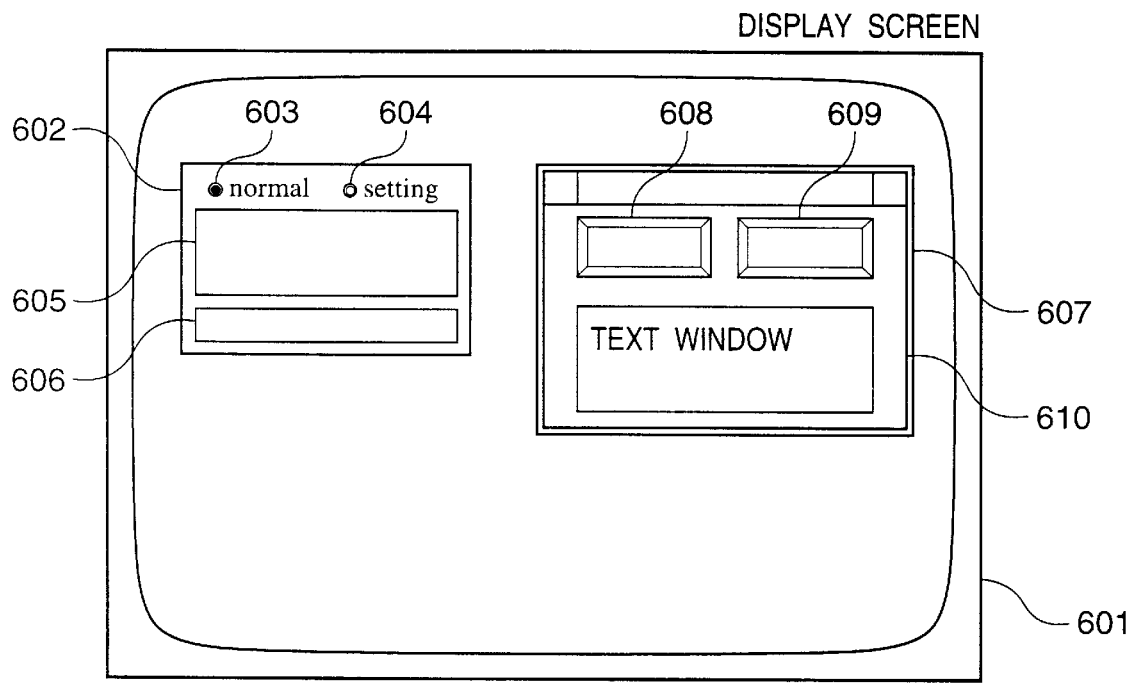
FIGS. 9A to 9F are views diagrammatically illustrating a computer display screen sequentially changing at the program debugging time in the program debugging system shown in FIG. 4.

A computer display screen 601 will be described with reference to FIG. 9A. The computer display screen 601 includes a main window 602 for the debugger and a GUI information displaying section 607. The main window 602 for the debugger includes buttons 603 and 604 used for indicating whether the execution of the program is a normal execution or for selling the break condition, a window 605 for displaying the program to be debugged, and a command window 606 used for inputting a command. On the other hand, the GUI information displaying section 607 shows one example of the user-prepared GUI parts to be debugged, and includes push buttons 608 and 609 and a text window 610 used for inputting and displaying a character train.

Figure 9B:
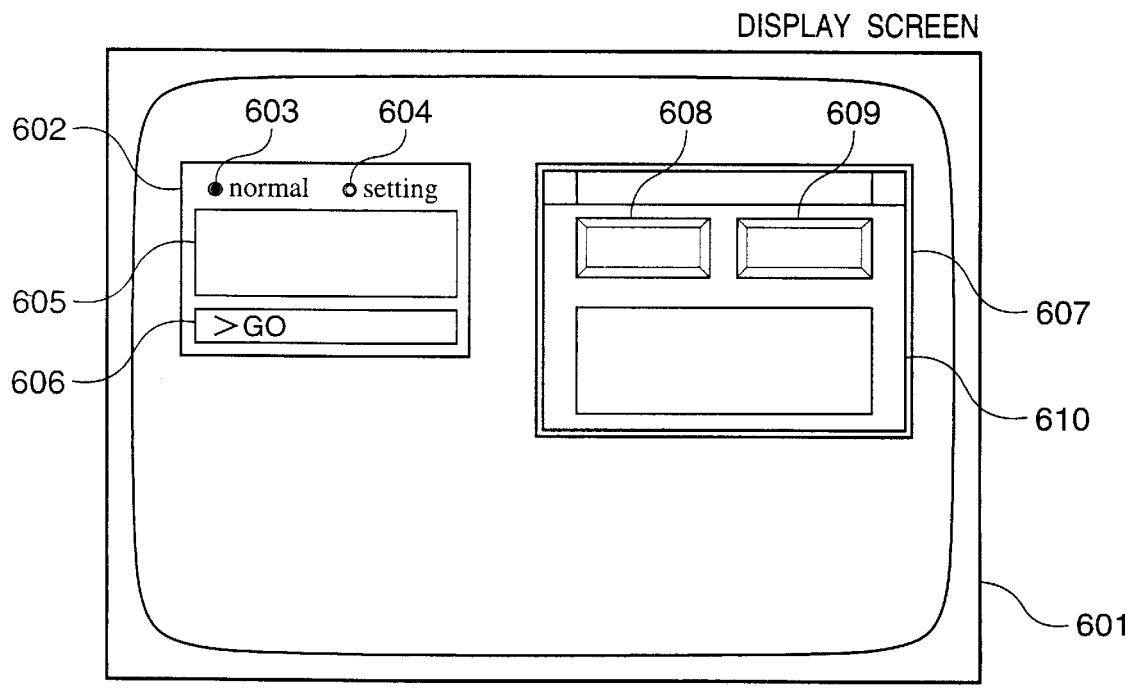

First, as shown in FIG. 9B, the command is inputted to the command window 606 within the main window 602 for the debugger, in order to instruct the execution of the program to be debugged.

Figure 9C:
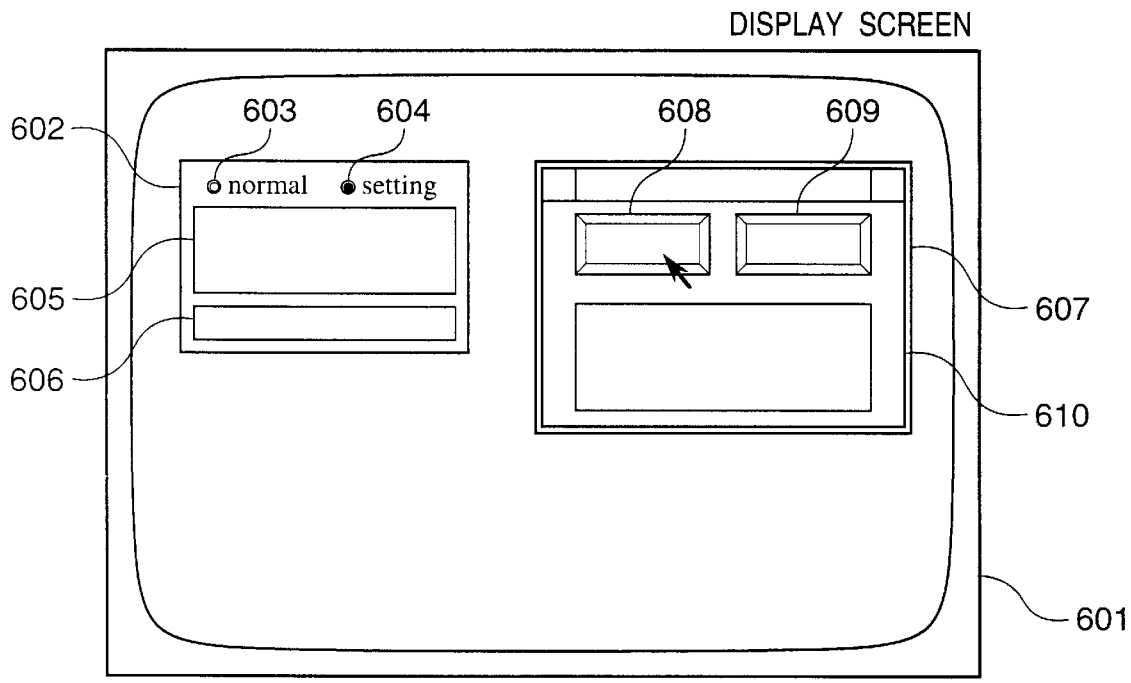

Then, as shown in FIG. 9C, the button 604 within the main window 602 for the debugger is pushed or selected to switch the execution mode to the break condition setting mode. In the course of the execution of the break condition setting mode, the break condition is set by designating the GUI parts in the GUI information display section 607, for example by handling the button 604 as shown by a solid arrow.

Figure 9D:
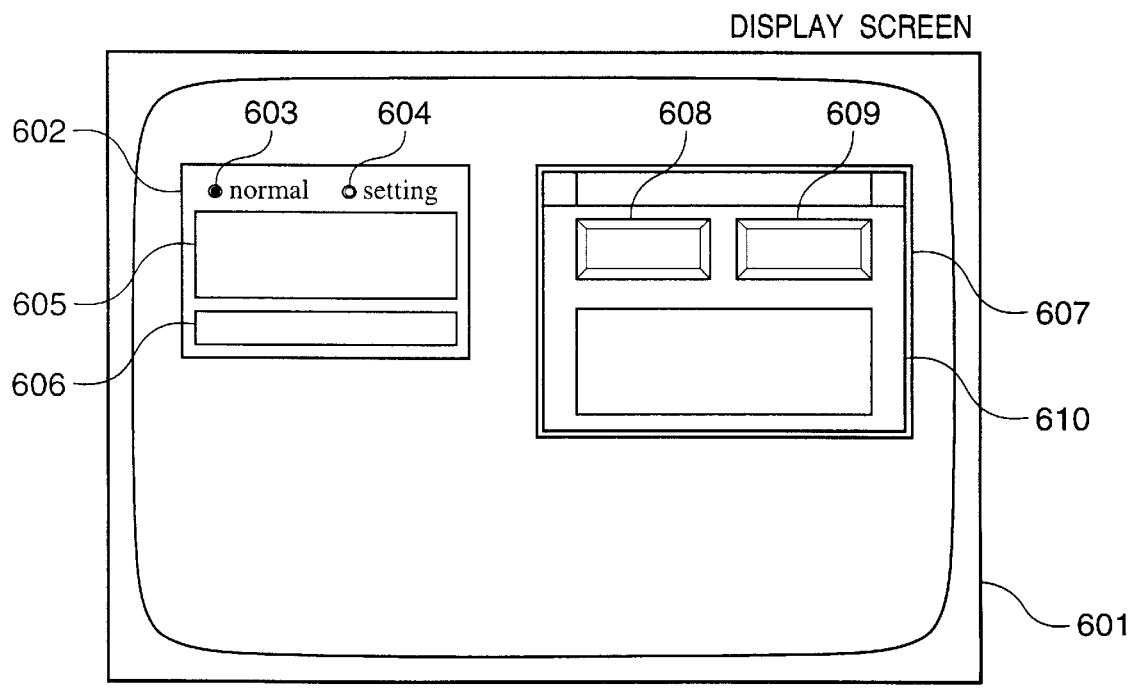
Figure 9E:
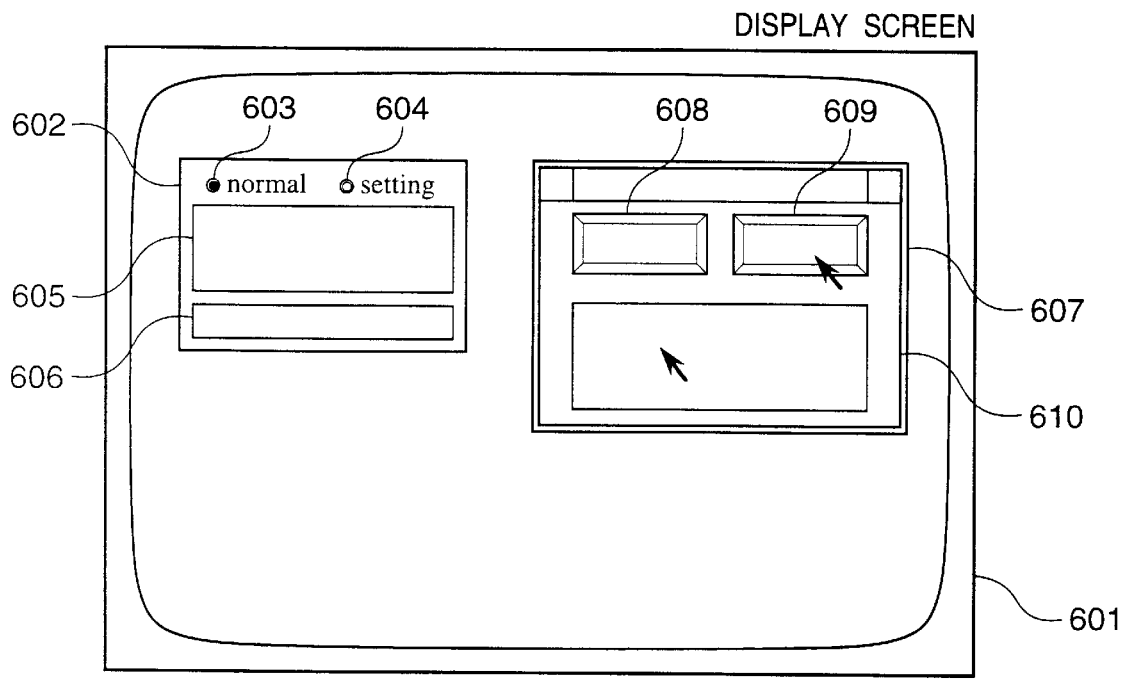
Figure 9F:
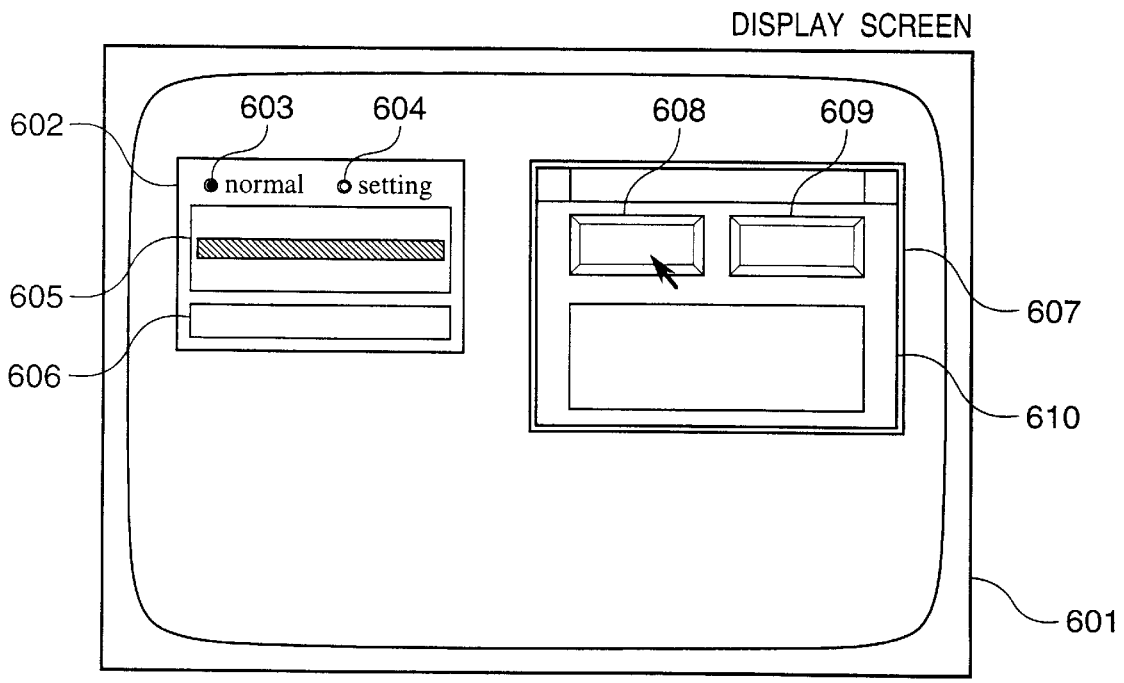

Thereafter, as shown in FIG. 9D, the button 603 within the main window 602 for the debugger is pushed or selected to return the execution mode to the normal mode, and as shown in FIG. 9E, the GUI parts in the GUI information display section 607 is handled as shown by solid arrows. Thus, when the GUI parts for which the break condition has been thus set, is handled, the break is generated as shown in FIG. 9F.

Figure 3:
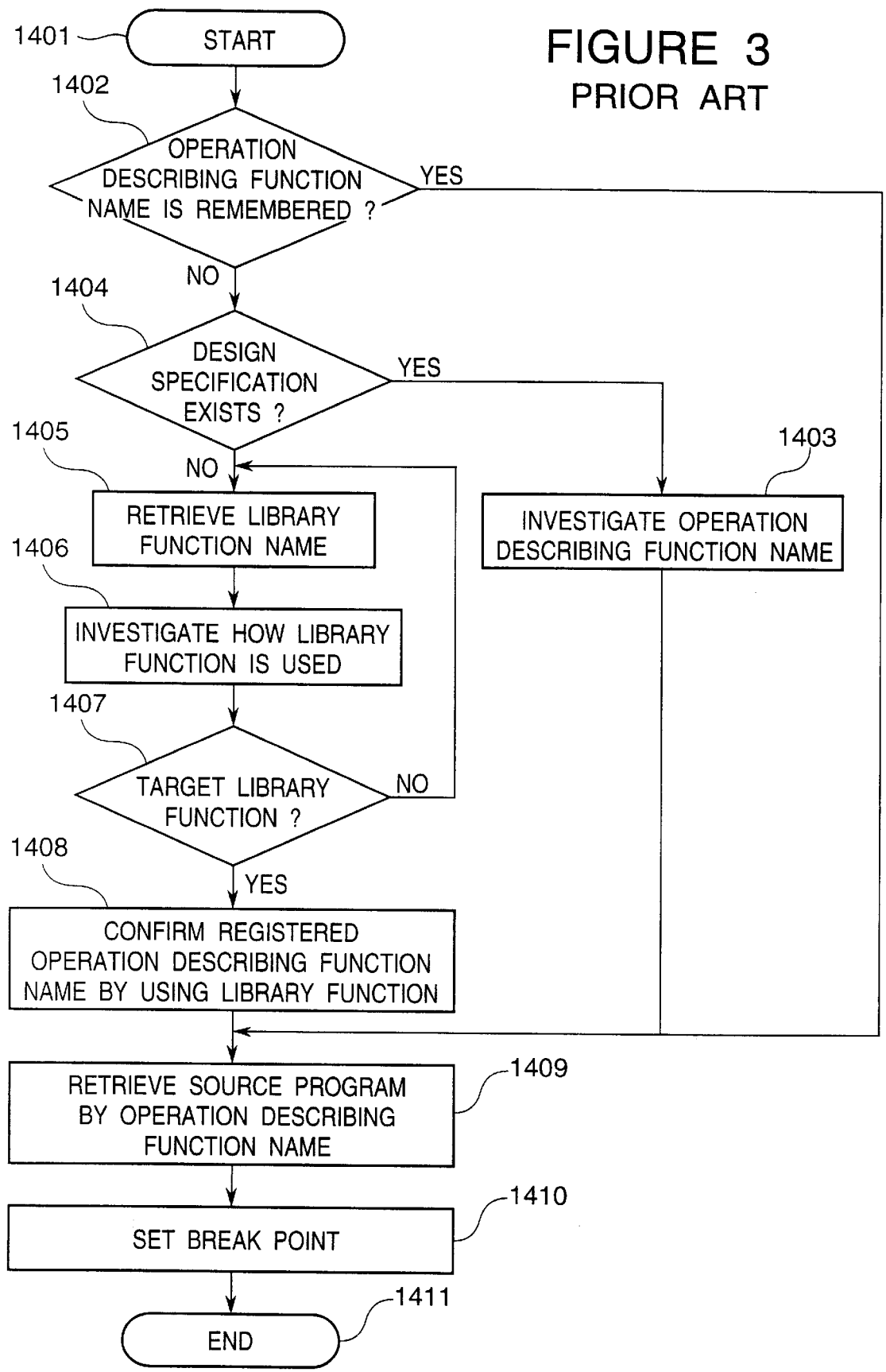
FIG. 3 is a flow chart illustrating the procedure for setting the break point for the operation describing function in the program having the GUI.

Thus, it will be understood that, in the first embodiment as mentioned above of the program debugging system in accordance with the present invention, the debugging procedure for the program having the GUI is greatly simplified in comparison with the debugging procedure shown in FIG. 3 of the conventional program debugging system.

As mentioned hereinbefore, there is a method in which, when the debugger executes the program, simulation is executed and stopped by using a simulator means which is a program for simulating execution of the program to be debugged. The present invention can be applied to this method, and this case will be called a second embodiment. In the second embodiment, the break condition is set as follows: Similarly to the above mentioned first embodiment, when the GUI parts operation is included, retrieval is conducted to find out the operation describing function corresponding to the GUI parts, from the GUI parts table holding the GUI information, by means of the break condition setting means, and then, the found-out operation describing function is held in the simulator means as the break condition. At each time one instruction in the program to be debugged is simulated, the address of the executed instruction is compared with an address value corresponding to the break point of the break condition. If coincidence is obtained, the execution of the simulation is stopped, and the processing is moved to the debugger, so that it waits for the command of the debugger. Accordingly, it would be apparent that an advantage similar to that of the first embodiment can be obtained in the second embodiment.

As mentioned above, the program debugging system in accordance with the present invention is characterized in that when the GUI parts operation is included, because retrieval is executed with reference to the GUI parts table holding the GUI information, so as to find out the operation describing function corresponding to the GUI parts, and the break condition is set, by means of the break condition setting means, the debugging procedure for the program having the GUI is greatly simplified.

In addition, at the time of debugging, it is no longer necessary to investigate throughout the whole structure of the program on the basis of the documents left by the program developer or the source file itself, and the analysis of the program at the time of the debugging can be localized to a portion of the program.

Furthermore, in the prior art, a stopping line is designated by reading the source program and to imagining the operation. In the present invention, on the other hand, the stopping line can be designated while observing and confirming the operation of the GUI by sight, without reading the source program and imagining the operation. Therefore, the working becomes very easy.

The invention has thus been shown and described with reference to the specific embodiments. However, it should be noted that the present invention is in no way limited to the details of the illustrated structures but changes and modifications may be made within the scope of the appended claims.

I claim:

1. A program debugging system for debugging a program having a graphical user interface ("GUI") and which arranges a visible part on a display screen for the purpose of realizing a direct-view handling, the system including a debugger for stopping execution of a source program at a set break point and ascertaining a program exaction condition, wherein a translator for translating said source program into a machine language program includes a GUI information output portion for extracting information of a GUI part from said source program and outputting GUI information relating an operation descriptor describing an operation of said GUI part with said GUI part itself, and said debugger includes a break condition setter for retrieving said source program with reference to said GUI information, to determine the operation descriptor corresponding to said GUI part designated on the display screen, and for setting said break condition for the determined operation descriptor.

2. A program debugging system claimed in claim 1 further including a GUI parts table comprising said GUI information outputted from said GUI information output portion, and wherein said break condition setter retrieves said source program with reference to said GUI parts table, to determine the operation descriptor corresponding to said GUI part designated on the display screen.

3. A program debugging system claimed in claim 2 wherein said GUI parts table includes a "type" column indicating the kind of said GUI part, an "X-coordinate position" column indicating an X-coordinate position of said GUI part on said display screen, a "Y-coordinate position" column indicating a Y-coordinate position of said GUI part on said display screen, a "height" column indicating a height of said GUI part, a "width" column indicating a width of said GUI part, and a "name" column indicating an operation describing function name of an operation executed when said GUI part is handled.

* * * * *